(12) United States Patent
Bai et al.

(10) Patent No.: US 10,126,140 B2
(45) Date of Patent: Nov. 13, 2018

(54) SYSTEMS AND METHODS FOR PROGRESSIVE MAP MAINTENANCE AND COMMUNICATION CHANNEL SELECTION

(71) Applicant: GM Gobal Technology Operations LLC, Detroit, MI (US)

(72) Inventors: Fan Bai, Ann Arbor, MI (US); Donald K. Grimm, Utica, MI (US); David E. Bojanowski, Clarkston, MI (US); Chia-Hsiang Liu, Milford, MI (US); Jinzhu Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/448,324

(22) Filed: Mar. 2, 2017

(65) Prior Publication Data

US 2017/0256034 A1    Sep. 7, 2017

Related U.S. Application Data

(60) Provisional application No. 62/303,945, filed on Mar. 4, 2016.

(51) Int. Cl.
| | |
|---|---|
| *G01C 21/36* | (2006.01) |
| *G06T 3/40* | (2006.01) |
| *G06F 3/147* | (2006.01) |
| *H04L 29/08* | (2006.01) |
| *H04L 29/06* | (2006.01) |
| *G01C 21/32* | (2006.01) |

(52) U.S. Cl.
CPC .............. *G01C 21/36* (2013.01); *G01C 21/32* (2013.01); *G06F 3/147* (2013.01); *G06T 3/4092* (2013.01); *H04L 67/2847* (2013.01); *H04L 69/14* (2013.01); *G09G 2350/00* (2013.01); *G09G 2370/16* (2013.01)

(58) Field of Classification Search
CPC ......... G06T 3/40; G06T 3/4092; G01C 21/36; G06F 3/147; H04L 29/08
USPC ....................................................... 701/451
See application file for complete search history.

(56) References Cited

U.S. PATENT DOCUMENTS

| | | | |
|---|---|---|---|
| 8,126,889 B2* | 2/2012 | Pitt ..................... | G06Q 20/382 455/404.2 |
| 9,714,835 B2* | 7/2017 | Nogawa ................ | G01C 21/32 |
| 2006/0106534 A1* | 5/2006 | Kawamata ............ | G01C 21/32 701/532 |

(Continued)

*Primary Examiner* — Tan Q Nguyen
(74) *Attorney, Agent, or Firm* — Tiffany N. Logan; Parks IP Law LLC

(57) ABSTRACT

A system having a resource-availability module configured to cause the processing unit to determine whether a resource scarcity condition exists in connection with providing map data to a mobile navigation unit. The system also includes a tuning-parameter module configured to cause the processing unit to, in response to determining that the resource scarcity condition exists, determine a tuning parameter to use in preparing map data to provide to the mobile navigation unit. The system further includes an encoding module configured to cause the processing unit to encode map data based on the tuning parameter, and a map-data-delivery module configured to cause the processing unit to provide or make available the encoded map data to the mobile navigation unit.

18 Claims, 7 Drawing Sheets

(56) References Cited

U.S. PATENT DOCUMENTS

| | | | | |
|---|---|---|---|---|
| 2011/0106431 A1* | 5/2011 | Tomobe | ................ | G01C 21/32 |
| | | | | 701/533 |
| 2011/0144899 A1* | 6/2011 | Soelberg | ............ | G01C 21/3461 |
| | | | | 701/532 |
| 2015/0046082 A1* | 2/2015 | Okamoto | ................ | H04W 4/21 |
| | | | | 701/454 |
| 2015/0142301 A1* | 5/2015 | Dave | ................. | G01C 21/3461 |
| | | | | 701/423 |

* cited by examiner

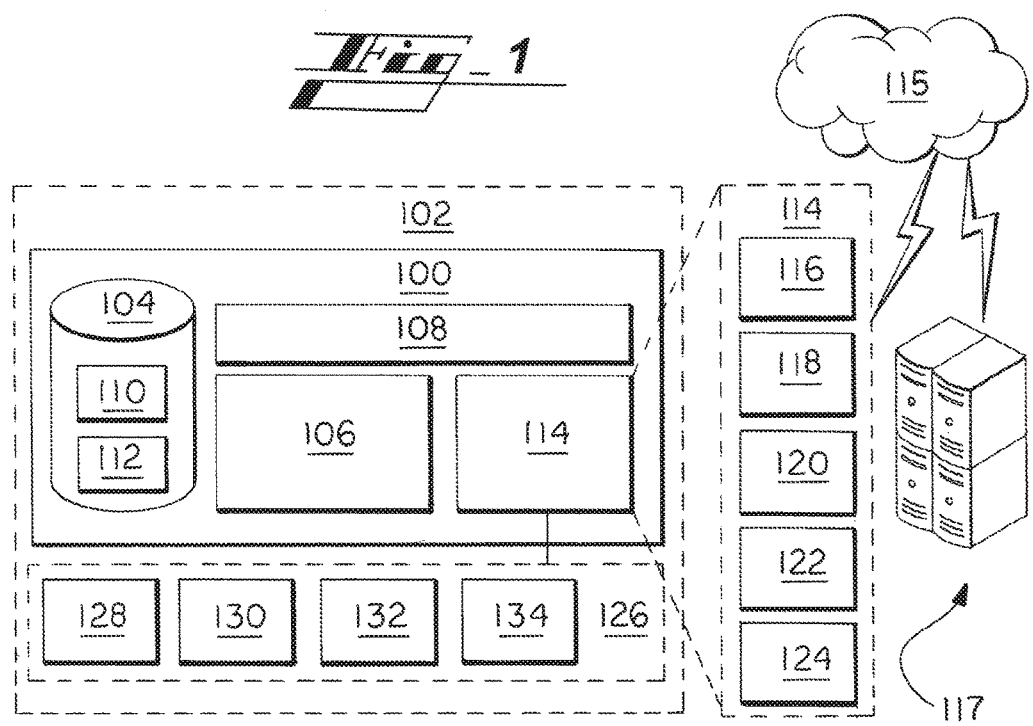
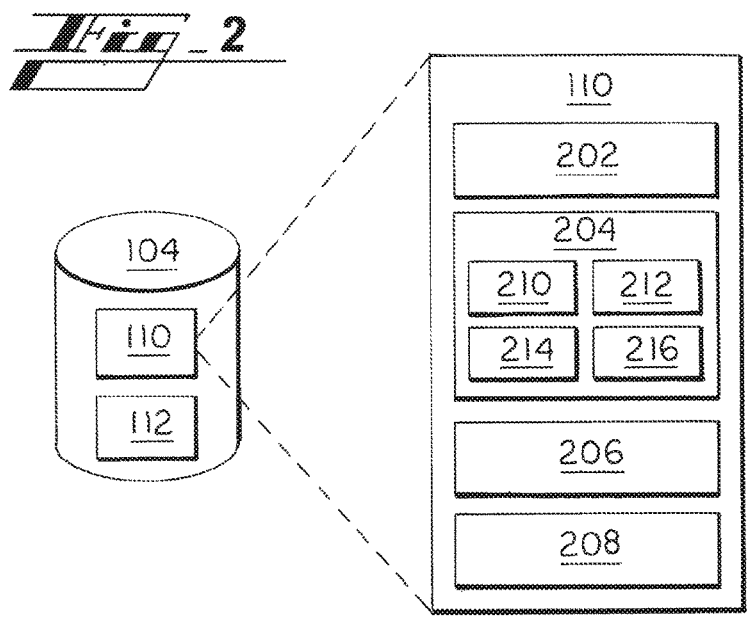

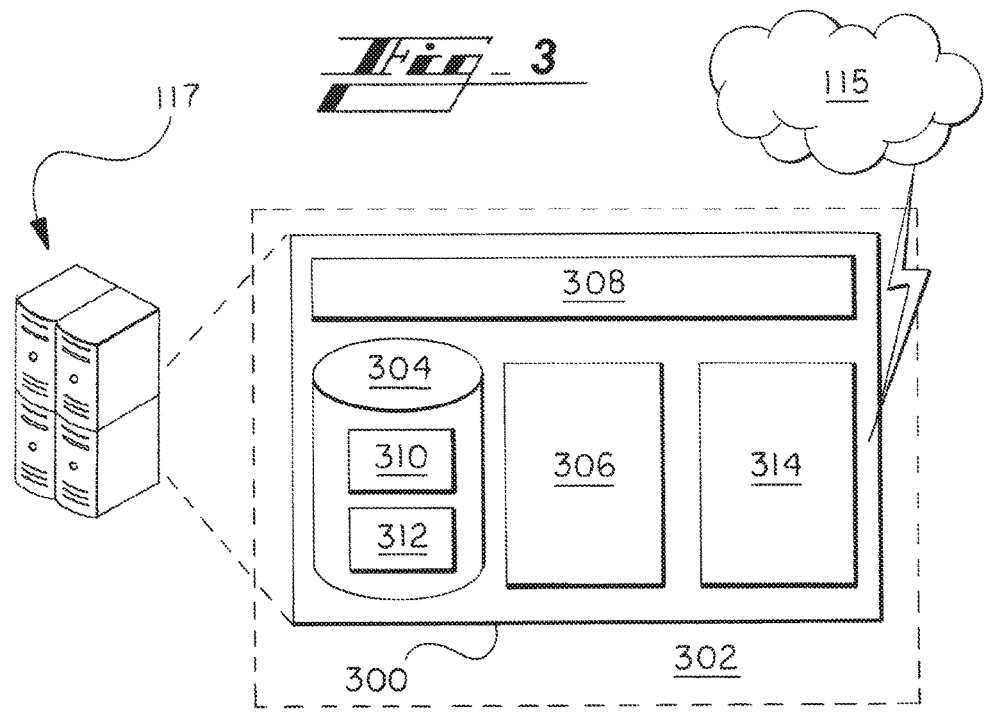
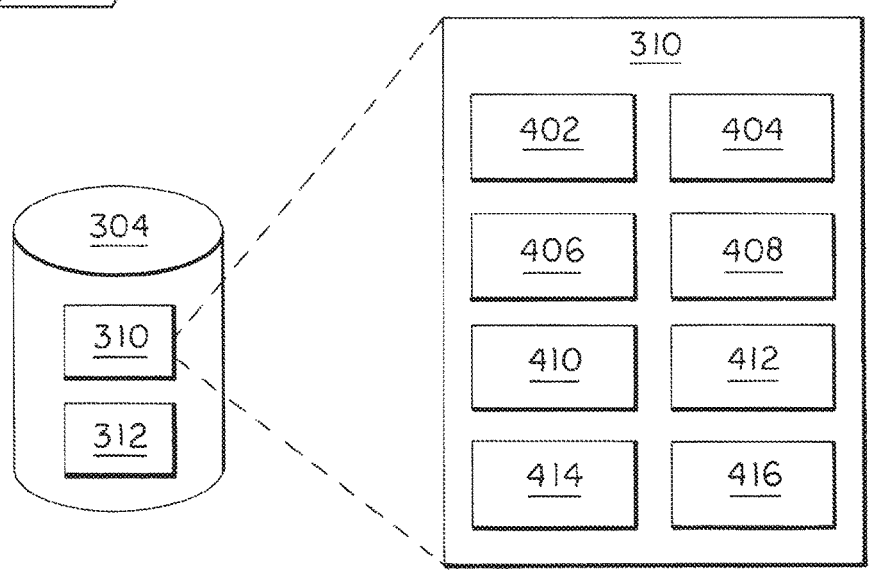

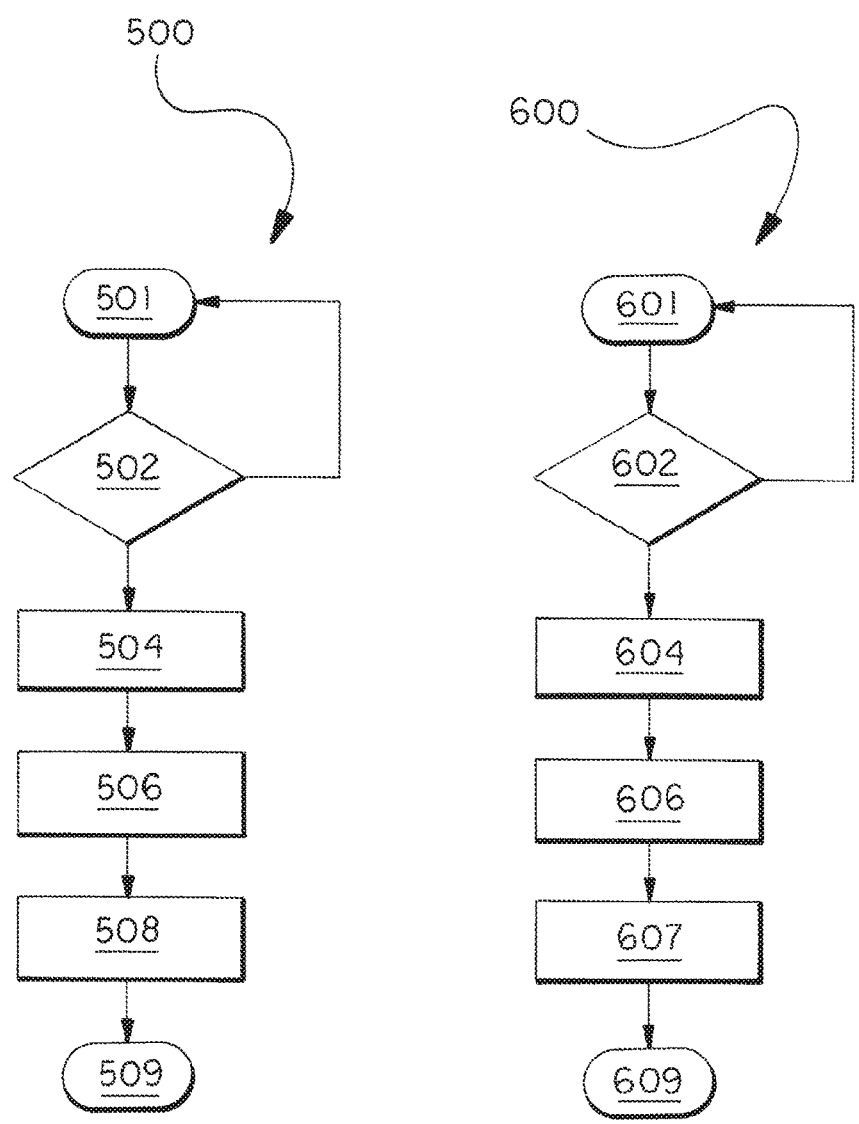

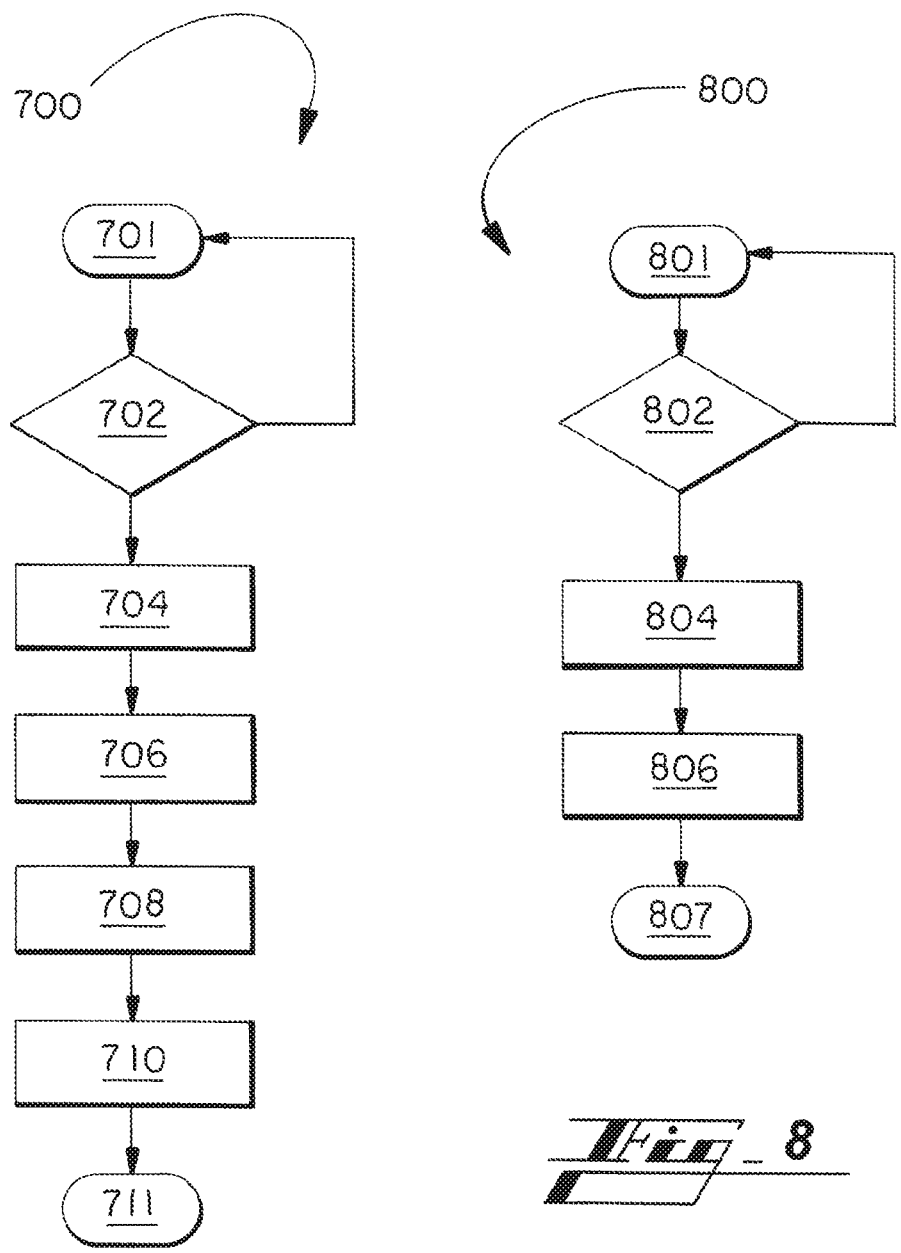

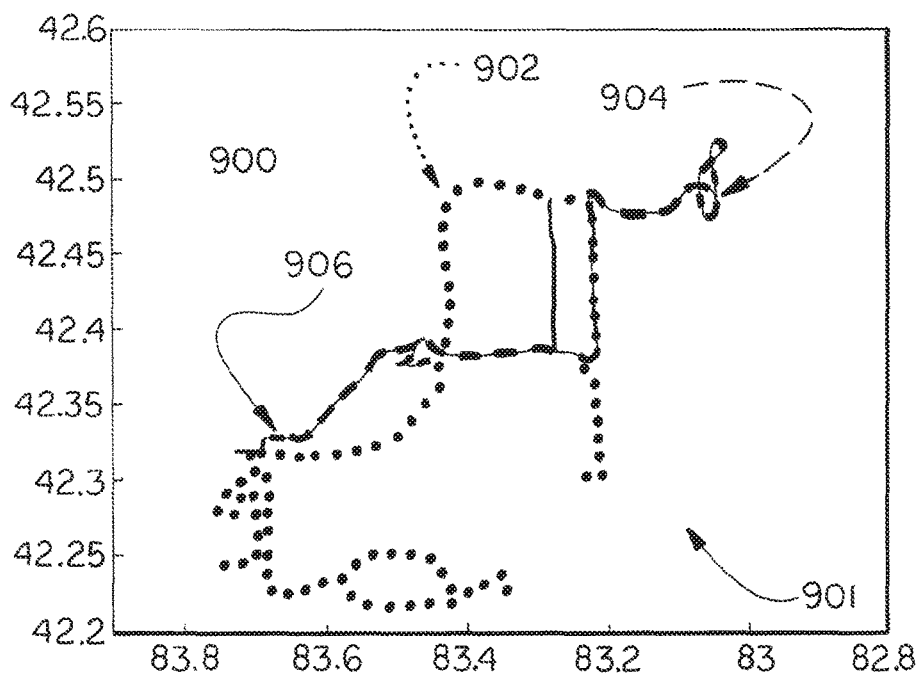
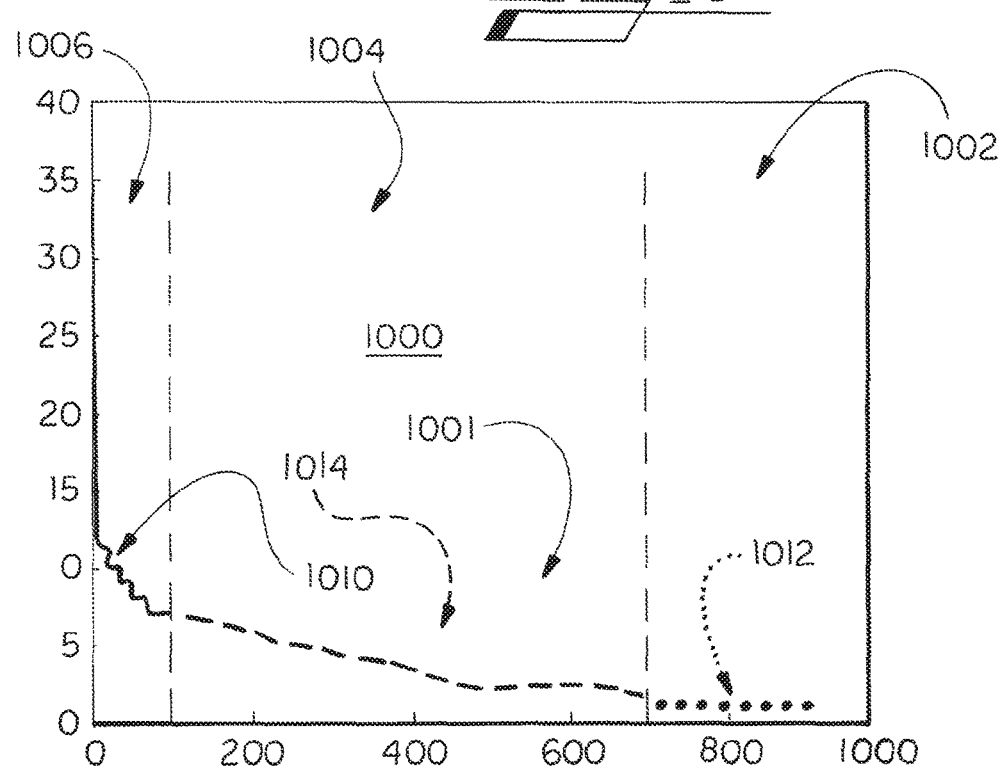

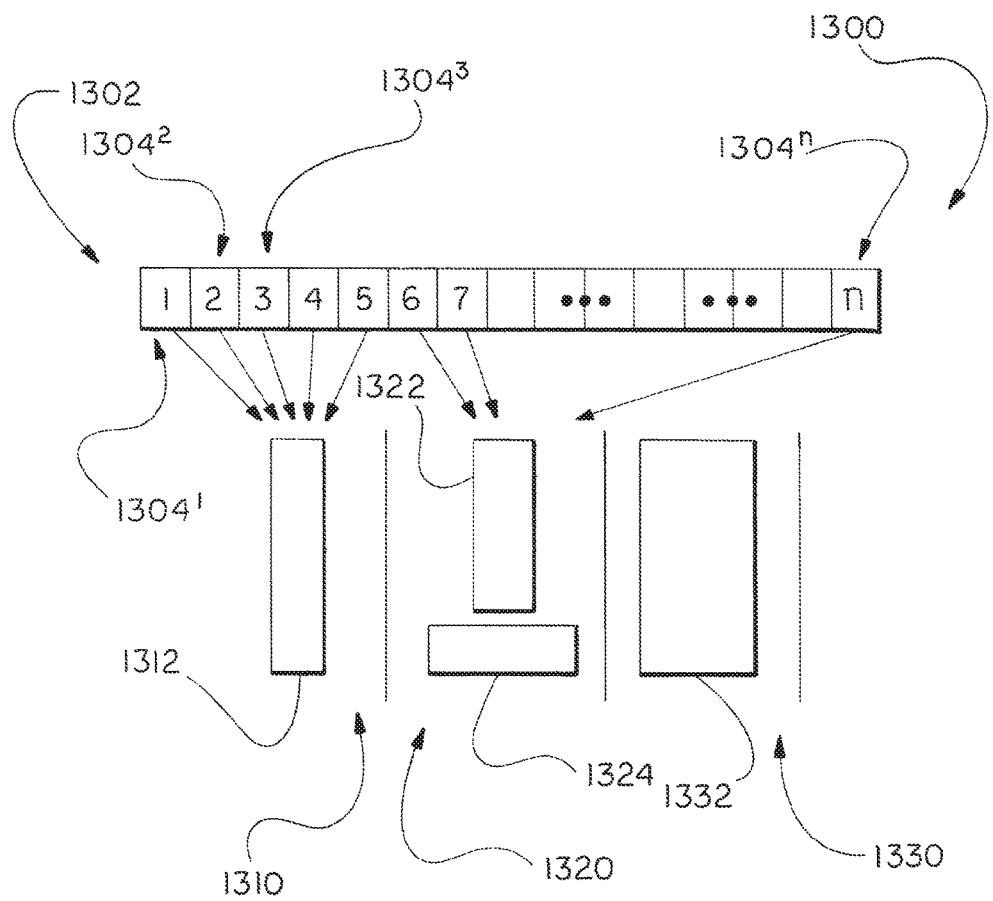

SYSTEMS AND METHODS FOR PROGRESSIVE MAP MAINTENANCE AND COMMUNICATION CHANNEL SELECTION

TECHNICAL FIELD

The present disclosure relates generally to systems and methods for maintaining maps for digital display and, more particularly, to systems and methods for refreshing and updating maps using algorithms configured to consider factors such as map properties, driver travel behaviors, preferred level of granularity, data availability, cost, and bandwidth conditions.

In various embodiments, the technology includes a hybrid, or multi-path, connectivity arrangement configured to determine which of a plurality of available communication channels or paths should be used to make present map-data transmissions.

BACKGROUND

This section provides background information related to the present disclosure which is not necessarily prior art.

Most modern vehicles include infotainment systems providing navigation guidance. Map update and refresh operations at these systems is resource intensive.

In addition to providing maps for driver or passenger use, many autonomous or semi-autonomous vehicle systems rely on map data. An electric semi-autonomous vehicle may consider road grade, for instance, in determining a cruise speed optimal for energy conservation. As another example, a fully autonomous vehicle relies on high-resolution data in making driving decisions.

High cost of operating these systems include relatively high requirements for in-vehicle processing bandwidth. Other high costs include relatively high requirements for in-vehicle data storage space and communication-network bandwidth, such as bandwidth of cellular communications.

Infotainment systems are continuously developing. Improvements include increased speed of display and amount of information available.

Regarding mapping, particular improvements include increased detail in the display. The increased detail includes more definition and features. The increased detail, and related requirements for frequent high-density updates, are accompanied by the aforementioned costs.

The very high levels of mapping detail also far exceeds basic user needs for navigation or location-following, yet are provided homogenously or uniformly, across all features of the viewing screen, and under all circumstances.

Another challenge of conventional systems is that transmission of map data can be very expensive and cumbersome, being made without consideration given to circumstances.

SUMMARY

The present technology solves the aforementioned problems and others by providing apparatus and methods for refreshing and updating maps using a specialized progressive coding.

The code defines one or more algorithms configured to process factors, such as map properties and navigation-unit movement, which can also be referred to as user or driver behaviors, in determining map-data update and refresh characteristics, such as a timing and content of map data updated and refreshed—e.g., what data is updated when.

In various embodiments, the technology includes a progressive encoding mechanism, or algorithm, for map refresh and download. The algorithm is configured to prioritize important or critical elements over less-critical, or less-important, important elements. For instance, elements can be assigned to a high-critical level and a low-critical level being therefore less critical than the high-critical-level elements.

In various embodiments, the technology includes an algorithm having a map refresh and/or update strategy that combines periodic pre-loads of critical elements and on-demand refresh of less critical elements. An example period for the pre-loading is monthly.

In various embodiments, the technology includes a hybrid, multi-path, connectivity arrangement or platform that schedules transmission of prioritized map content over a first communication channel, such as via one particular wireless path, such as a cellular communication channel, while non-priority, or lower-priority, data is transferred over a second communication channel, such as Wi-Fi channel accessible through road-side infrastructure, wireless path, wherein the channels are associated with different use costs.

Other aspects of the present technology will be in part apparent and in part pointed out hereinafter.

DESCRIPTION OF THE DRAWINGS

FIG. 1 illustrates schematically a first computer architecture, according to an embodiment of the present technology.

FIG. 2 shows first example memory components of the computer architecture of FIG. 1.

FIG. 3 illustrates schematically a second computer architecture, according to an embodiment of the present technology.

FIG. 4 shows second example memory components of the computer architecture of FIG. 2.

FIG. 5 shows a first progressive encoding process, based on map characteristics, according to embodiments of the present technology.

FIG. 6 shows a second progressive encoding process, based on determined need for granularity or detail of map attributes.

FIG. 7 shows a second progressive encoding process, based on navigation-unit movement; which can also be referred to as user or driver behaviors.

FIG. 8 shows an example hybrid, multi-path, algorithm.

FIG. 9 shows example paths of a vehicle over time, relevant to the second progressive encoding process of FIG. 7.

FIG. 10 shows a chart including number of visits (y axis) to various locations according to the paths of FIG. 8 versus a road-segment index (x axis), relevant to the second progressive encoding process of FIG. 7.

FIG. 13 illustrates schematically aspects of a hybrid, multi-path, connectivity platform, according to an embodiment of the present technology.

Figure 11:
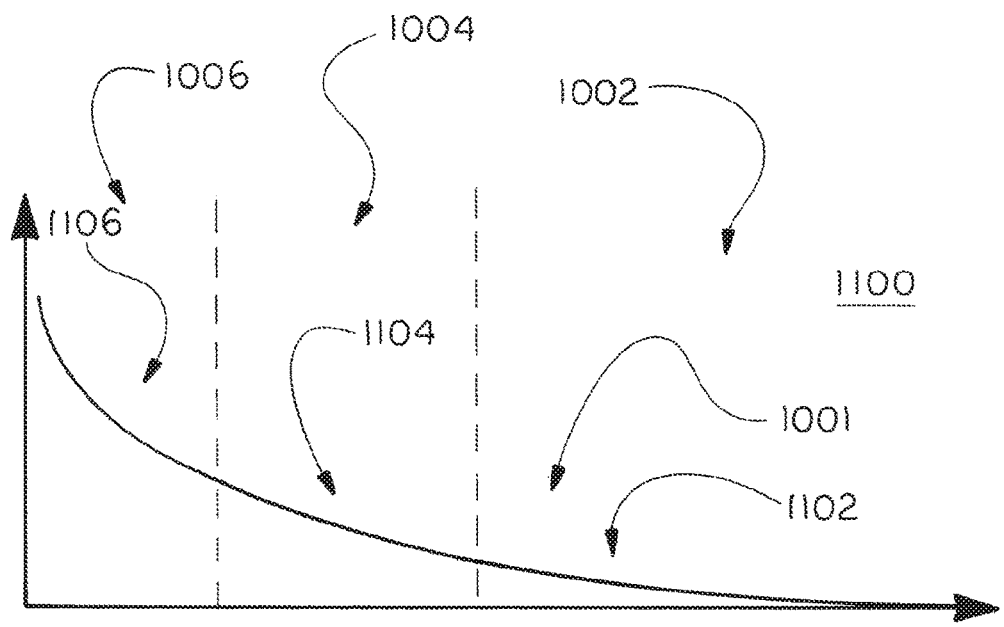
FIG. 11 illustrates a chart, consistent with the data of FIGS. 9 and 10, including an estimated usefulness (y axis) of providing additional map data to the subject navigation system versus the road-segment index (x axis), also relevant to the second progressive encoding process of FIG. 6.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration; specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Introduction

The present disclosure describes, by various embodiments, apparatus for refreshing and updating maps being rendered for digital display.

The apparatus performs the refresh and updating functions using algorithms configured to consider factors such as map properties, granularity needs, navigation-unit movement, which can also be referred to as vehicle movement (when nav unit and vehicle move together) or user or driver behaviors.

Map properties considered in various embodiments include an importance, or criticality, level assigned to elements of the map being rendered. For instance, a one-way-street indication (e.g., sign) has a very high level of importance, and so is associated with a higher display priority in the underlying algorithm as compared to, for instance, indication with ultra-high accuracy of the exact location of the vehicle on a highway.

Analyzing navigation-unit movement, or user behavior, in various embodiments includes analyzing historical, or historical and present movement characteristics of the nav unit. Characteristics considered in various embodiments include how often the navigation unit has been present in a subject geographic area or along a route. When the navigation unit is moved as the host vehicle is being driven, the variable being analyzed can be referred to as driver behavior in addition to or instead of navigation-unit movement. A driver would likely require less detail in a map while they are in their everyday commute than when they are travelling in a new city, for instance.

Data availability or bandwidth conditions can include bandwidth scarcity and normal conditions, just by way of example.

The underlying algorithm is configured to, based on such inputs, control map-processing functions, such as variable timing, density, and content characteristics for map downloads, refreshes, and/or updates.

While the present technology is described primarily herein in connection with automobiles, the technology is not limited by the focus. The concepts can be extended to a wide variety of applications, such as in connection with other vehicles of transportation, such as aircraft, marine craft, the like, and other. The concepts can be used with human-driven, semi-autonomous, or autonomous driving modes or vehicles.

The concepts can be used with other devices used in connection with human mobility or transportation, such as mobile phones or tablets, wearable mapping devices, such as optical head-mounted displays or virtual reality eye glasses.

II. On-Board Computing Architecture—FIG. 1

Turning now to the figures and more particularly the first figure, FIG. 1 illustrates a hardware-based computing or controlling apparatus 100. The controlling apparatus 100 can be referred to by other terms, such as computing apparatus, controller, controller apparatus, the like, or other.

The controller apparatus 100 is in various embodiments part of a greater system 102, such as a vehicle. The controller apparatus 100 can be, be a part of, include, or be in communication with an on-board computer (OBC), an electronic control unit (ECU), or other computing apparatus of the greater system 102—for example, a vehicle, such as an automobile.

The hardware-based controlling apparatus 100 includes a hardware-based computer-readable storage medium, or data storage device 104 and also includes a hardware-based processing unit 106 connected or connectable to the computer-readable storage device 104 by way of a communication link 108, such as a computer bus or wireless structures.

The hardware-based processing unit 106 can be referenced by other names, such as processor, processing hardware unit, the like, or other.

The hardware-based processing unit 106 can include or be multiple processors, which could include distributed processors or parallel processors in a single machine or multiple machines. The hardware-based processing unit 106 can be used in supporting a virtual processing environment.

The hardware-based processing unit 106 could include a state machine, application specific integrated circuit (ASIC), programmable gate array (PGA) including a Field PGA, or state machine. References herein to the hardware-based processing unit executing code or instructions to perform operations, acts, tasks, functions, steps, or the like, could include the hardware-based processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the hardware-based processing unit 106 to perform the functions of the hardware-based controlling apparatus 100 described herein. The modules and functions are described further below in connection with FIG. 2, et seq.

The data storage device 104 in some embodiments also includes ancillary or supporting components 112, such as additional software and/or data supporting performance of the processes of the present disclosure, such as one or more user profiles or a group of default and/or user-set preferences.

The hardware-based controlling apparatus 100 also includes a communication sub-system 114 for communicating with one or more local and/or external networks 115, such as the Internet, or devices 117.

The communication sub-system 114 in various embodiments includes any of a wire-based input/output (i/o) 116, at least one long-range wireless transceiver 118, and one or more short- and/or medium-range wireless transceivers 120. Two other ports 122, 124 are shown by way of example to emphasize that the system can be configured to accommodate other types of wired or wireless communications.

The long-range transceiver 118 is in some embodiments configured to facilitate communications between the hardware-based controlling apparatus 100 and a satellite and/or a cellular telecommunications network, which can be considered also indicated schematically by reference numeral 115.

The short-range transceiver 120 is configured to facilitate short-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (e.g., pedestrians, cyclists, etc.).

To communicate V2V, V2I, or with other extra-vehicle devices, such as local communication routers, etc., the short-range communication transceiver 120 may be configured to communicate by way of one or more short-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short- and/or long-range wireless communications, the hardware-based controlling apparatus 100 can, via the communication sub-system 114 and the processor 106, send and receive information, such as in the form of messages or packetized data, to and from the one or more communication networks 115

External devices 117 with which the sub-system 114 communicates are in various embodiments nearby, remote, or both.

External or extra-vehicle devices 117 to which the hardware-based controlling apparatus 100 can communicate in execution of the functions of the present technology, can include a remote server (e.g., application server) and/or a remote data, customer-service, and/or control center, which can be considered shown by, or reachable by, the indicated network(s) 115.

An example control center is the OnStar® control center, having facilities for interacting with vehicles and users, whether via the vehicle or otherwise (e.g., mobile phone) via long-range communications, such as satellite or cellular communications. ONSTAR is a registered trademark of the OnStar Corporation, which is a subsidiary of the General Motors Company.

The vehicle 102 also includes a sensor sub-system 126 comprising sensors providing information to the hardware-based controlling apparatus 100 regarding items such as vehicle operations, vehicle position, vehicle pose, and/or the environment about the vehicle 102. The arrangement can be configured so that the hardware-based controlling apparatus 100 communicates with, or at least receives signals from sensors of the sensor sub-system 126, via wired or short-range wireless communication links 116, 120.

In various embodiments, the sensor sub-system 126 includes at east one camera 128 and at least one range sensor 130, such as radar. The camera 128 may include a monocular forward-looking camera, such as those used in lane-departure-warning (LDW) systems. Other embodiments may include other camera technologies, such as a stereo camera or a trifocal camera.

Such sensor sensing external conditions may be oriented in any of a variety of directions without departing from the scope of the present disclosure. For example, cameras 128 and radar 130 may be oriented at each, or a select, position of, for example, (i) facing forward from a front center point of the vehicle 102, (ii) facing rearward from a rear center point of the vehicle 102, (iii) facing laterally of the vehicle from a side position of the vehicle 102, and/or (iv) between these directions, and each at or toward any elevation.

Accordingly, the descriptions below, made primarily with respect to forward-facing sensors, may be applied with respect to rearward and/or side facing sensors, independently or in combination with forward-facing sensors.

The range sensor 130 may include a short-range radar (SRR), an ultrasonic sensor, a long-range RADAR, such as those used in autonomous or adaptive-cruise-control (ACC) systems, or a Light Detection And Ranging (LiDAR) sensor, for example.

Other sensor sub-systems include an inertial-momentum unit (IMU) 132, such as one having one or more accelerometers, and/or other such dynamic vehicle sensors 134, such as a wheel sensor or a sensor associated with a steering system (e.g., steering wheel) of the vehicle 102.

III. First Example Data Storage—FIG. 2

FIG. 2 shows in more detail the data storage device 104 of FIG. 1. The components of the data storage device 104 are now described further with reference to the figure.

III.A. Memory Components

As mentioned, the data storage device 104 includes one or more modules 110.

The data storage device 104 may also include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

The modules 110 can include at least three (3) modules 202, 204, 206.

FIG. 2 also shows an additional module by reference numeral 208 to indicate that the hardware-based controlling apparatus 100 can include one or more additional modules. The supporting module(s) 208 can include, for example, one or more driver-account modules and/or passenger-account modules for use in creating and maintaining user accounts, which can include preferences, settings, the like, and other.

Any of the code or instructions described can be part of more than one module. And any functions described herein can be performed by execution of instructions in one or more modules, though the functions may be described primarily in connection with one module by way of primary example.

Each of the modules can be referred to by any of a variety of names, such as by a term or phrase indicative of its function. Example terms are provided below.

Any of the modules can include sub-modules, such as shown by sub-modules 210, 212, 214, 216 of the second illustrated module 204 of FIG. 2. Sub-modules can cause the processing hardware-based unit 106 to perform specific operations or routines of module functions. Each sub-module can also be referred to by any of a variety of names, such as by a term or phrase indicative of its function.

III. Remote Computing Architecture—FIG. 3

FIG. 3 illustrates the hardware-based computing or controlling apparatus 300, which can, as shown in FIG. 4, be, or be a part of, or include the remote system 117 of FIG. 1.

The apparatus 300 is in various embodiments part of a data, customer-service, and/or control center, such as the mentioned OnStar® control center.

The controlling apparatus 300 can be referred to by other terms, such as computing apparatus, controller, controller apparatus, the like, or other.

The controller apparatus 300 is in various embodiments part of a greater system 302, such as a vehicle. The controller apparatus 300 can be, be a part of, include, or be in communication with a server or computing system configured to provide remote or cloud services to navigation units, such as the navigation units of in-vehicle infotainment systems.

The hardware-based controlling apparatus 300 includes a hardware-based computer-readable storage medium, or data storage device 304 and also includes a hardware-based processing unit 306 connected or connectable to the computer-readable storage device 304 by way of a communication link 308, such as a computer bus or wireless structures.

The hardware-based processing unit 306 can be referenced by other names, such as processor, processing hardware unit, the like, or other.

The hardware-based processing unit 306 can include or be multiple processors, which could include distributed processors or parallel processors in a single machine or multiple machines. The hardware-based processing unit 306 can be used in supporting a virtual processing environment.

The hardware-based processing unit 306 and data storage device 304 can have or be associated with any of the formats, structures, and nomenclature described above for the unit 106 and device 104 of FIG. 1.

For example, the data storage device 304 in various embodiments includes one or more storage modules 310 storing computer-readable code or instructions executable by the hardware-based processing unit 306 to perform the functions of the hardware-based controlling apparatus 300 described herein. The modules and functions are described further below in connection with FIG. 4, et seq.

The data storage device 304 in some embodiments also includes ancillary or supporting components 312, such as additional software and/or data supporting performance of the processes of the present disclosure, such as user profiles, map databases, and instructions sets for adjusting or encoding map data as desired.

The hardware-based controlling apparatus 300 also includes a communication sub-system 314 for communicating with one or more local and/or external networks 115, such as the Internet, and thereby systems including local mapping apparatus 100.

The communication sub-system 114 in various embodiments includes any of a wire-based input/output (i/o), at least one long-range wireless transceiver, and one or more short- and/or medium-range wireless transceivers.

IV. Second Example Data Storage—FIG. 4

FIG. 4 shows in more detail the data storage device 304 of FIG. 3. The components of the data storage device 304 are now described further with reference to the figure.

IV.A. Memory Components

As mentioned, the data storage device 304 includes one or more modules 310.

The data storage device 304 may also include ancillary components 312, such as additional software and/or data supporting performance of the processes of the present disclosure. The ancillary components 312 can include, for example, such as additional software and/or data supporting performance of the processes of the present disclosure, such as user profiles, map databases, and instructions sets for adjusting or encoding map data as desired.

The modules 310 are show by way of example to include eight modules: 402, 404, 406, 408, 410, 412, 414, 416, 418.

The modules 310 can include additional, supporting modules 420. The additional module(s) 420 can include, for example, modules configured to access a map database or create and maintain user accounts, which can include preferences, settings, the like, and other.

Any of the code or instructions described can be part of more than one module. And any functions described herein can be performed by execution of instructions in one or more modules, though the functions may be described primarily in connection with one module by way of primary example.

Each of the modules can be referred to by any of a variety of names, such as by a term or phrase indicative of its function. Example terms are provided below.

Any of the modules can include sub-modules. Sub-modules can cause the processing hardware-based unit 306 to perform specific operations or routines of module functions. Each sub-module can also be referred to by any of a variety of names, such as by a term or phrase indicative of its function.

The modules and their functions are described more below.

V. Algorithms—FIGS. 5-8

FIGS. 5, 6 and 7 show algorithms for various manners to process map data, such as various types of progressive encoding of map data. Factors considered in determining how to encode the data can be referred to as tuning parameters.

The tuning parameters affect tunable map parameters, such as the content, timing, manner (e.g., push vs. pull), and channel (e.g. wifi vs. cellular) in providing map data.

The tuning parameters are considered by one or more of various context, or tuning-parameter modules. Example tuning parameters include (i) priority, or prioritization, of map features, (ii) granularity, and (iii) navigation unit movement.

Example tuning-parameter modules include a priority-setting module 404, a granularity-determination module 410, and a movement-analysis module 414.

More particularly, FIG. 5 shows an example algorithm, represented schematically by a process flow 500, for progressive encoding of map data based on map features, according to embodiments of the present technology.

FIG. 6 shows an example algorithm, represented schematically by a process flow 600, for progressive encoding of map data based on a determined granularity or detail for map attributes, according to embodiments of the present technology.

FIG. 7 shows an example algorithm, represented schematically by a process flow 700, for progressive encoding of map data based on navigation-unit movement, which can also be referred to as user or driver behaviors.

FIG. 8 shows an algorithm for implementing a hybrid connectivity platform. The algorithm is represented schematically by a process flow 800, for a hybrid, multi-path, connectivity platform for transmitting map data to a local navigation device, according to embodiments of the present technology.

The algorithms 500, 600, 700, 800 can be used separately or in any combination. For instance, the system 300 can use any or all of the progressive-encoding algorithms, 500, 600, 700 to determine what map-attribute data to deliver to a mobile navigation unit and when, and not use the multi-path algorithm 800.

Or the system 300 can use the first progressive-encoding algorithm 500, regarding navigation-unit movement, or user behavior, to determine what map-attribute data to deliver to a mobile navigation unit and when, and use the multi-path algorithm 800 to determine when various map data is sent to the mobile navigation unit. Or the system 300 can use the first progressive-encoding algorithm 500, regarding map features, to determine what map-attribute data to deliver to a mobile navigation unit and when, and use the multi-path algorithm 800 to determine when various map data is sent to the mobile navigation unit. Or the system 300 can use only the multi-path algorithm 800 of this group of techniques 500, 600, 700, 800. Et cetera.

It should be understood that the steps, operations, or functions of the processes 500, 600, 700, 800 are not necessarily presented in any particular order and that performance of some or all the operations in an alternative order is possible and is contemplated. The processes can also be combined or overlap, such as one or more operations of one of the processes being performed in the other process.

Various progressive encoding algorithms are configured to determine, based on a priority of map aspects calculated, which map attributes to deliver to the navigation unit, and when, or make available for the navigation unit to access on-demand. These operation are improvements over conventional modern systems that deliver all map data to the vehicle by pre-load for a given region, such as all high-definition map data corresponding to a state of the country in which the nav unit exists.

The operations have been presented in the demonstrated order for ease of description and illustration. Operations can be added, omitted and/or performed simultaneously without departing from the scope of the appended claims. It should also be understood that the illustrated processes 500, 600, 700, 800 can be ended at any time.

In certain embodiments, some or all operations of the processes 500, 600, 700, 800 and/or substantially equivalent operations are performed by a processor, e.g., computer processor, executing computer-executable instructions stored or included on a computer-readable medium, such as one or both of the data storage devices 104, 304 of the systems 100, 300 described above.

V.A. First Progressive-Encoding Algorithm—FIG. 5

The first example progressive-encoding algorithm, illustrated as a process or flow 500 in FIG. 5, determines what map data to send or make available to a navigation unit, and when, based on a prioritization of map features. The basis is a first example basis, or tuning parameter, affecting tunable map parameters, such as the content, timing, manner (e.g., push vs. pull), and channel (e.g. wifi vs, cellular) in providing map data.

More particularly, in various embodiments, the process 500 involves prioritizing existing map attributes.

The prioritizing may be performed using a ranking function for prioritized individual attributes or categories of attributes and determining when or whether to deliver respective map data to a navigation unit. Example attributes include attributes or elements present in a map database remote to the navigation unit. An example nav units is an in-vehicle navigation unit, based on determined priorities for the existing map attributes.

The process intelligently controls how map data is handled and made available, including controlling property richness by which the map is rendered over time.

The process 500 begins 501 and in various embodiments, the algorithm 500 includes an operation, indicated by diamond 502, whereat a processor, such as the hardware-based processing unit 306 determines whether a resource-scarce scenario exists.

The operation 502 can for some embodiments be referred to as a threshold decision, a threshold resource analysis, or the like. The decision 502 can be performed by a resource-availability module 402 (FIG. 4) comprising computer code configured to cause the processor to perform the functions of this operation 502.

The determination 502 is performed in any of a wide variety of ways, such as based on a pre-determined limitation on data usage, storage, and/or transfer. As an example, provider of a navigation unit, or a provider of the vehicle having the nav unit, such as an automobile original equipment manufacturers (OEMs), may already have data, or a setting, indicating a limit on procurement, storage, or use of data, generally, or map data in particular. Likewise, the determination 502 may be based on a limitation or limitations imposed by a service provider that implements data access restrictions—e.g., a limit on number of API invocations per time period.

The determination 502 is in various embodiments made in the affirmative if there is an undesirable cost associated with using, storing, or obtaining data, generally, or map data, particularly.

The decision 502 may be based on information obtained (e.g., received with or without being requested) from a third party, such as a communications network operator—for instance, an internet service provider (ISP) or cellular or telecommunications service provider. A service provider may limit data that an OEM or a vehicle system can use in a period of time, such as a day, week, or month, for instance. Or the provider may apply undesired cost of obtaining data, generally, or at certain times.

In embodiments comprising the decision 502, if the resource-scarce condition is not found present, flow returns to subsequently perform the decision 502. In this case, mapping operations could proceed in a last-established, base, or default, mode for the time being.

If the resource-scarce condition is found present at diamond 502, flow proceeds to operation 504, whereat the processor determines which map features (or feature category) are critical, or more important. The map features, characteristics or attributes, can be referenced by other terms, such as map elements, or map features. The operation 504 can also include determining which map features are non-critical, or less important.

In some embodiments, non-critical features are not determined, or features that were not deemed critical are deemed non-critical by default at this operation 504. The operation 504 can be performed by a priority-setting sub-package or module 404 (FIG. 4).

The priority setting module 404, the first of the example tuning-parameter modules, includes computer code configured to cause the processor 306 to perform the functions of this operation 504. The module 404 can also be referred to as a priority-determination module 404.

The characteristics are in various embodiments existing elements of relevant map-data source—e.g., a relevant map database or stored map structure. The map-data source can be, for instance, an open-source street map data source or a proprietary map data source, as examples.

While algorithms—e.g., the first and third algorithms 500, 700—are described at times herein as dividing available map attributes into three groups or categories: (1) high criticality, (2) medium criticality, and (3) low, or no, criticality, the processor can in any of the embodiments described divide the attributes into other number of groups.

As an example, the attributes can be divided into (1) critical and (2) non-critical. As another example, attributes can be divided into a (1) high (criticality) group, (2) a medium (criticality) group, and (3) a low criticality) group. As still another example, attributes can be divided into (1) high, (2) medium-high, (3) medium, (4) medium-low, and (5) low groups.

Attributes can also be divided into application categories, which can be assigned criticality values, or be defined as critical or required based on application need. For example, if the navigation system is active and a real-time traffic layer is requested, the required map elements would include those related to the navigation and traffic data that has been requested by the application. Alternatively, if only the real-time traffic information is needed, other types of navigation data would not need to be requested.

In various embodiments, the algorithm is configured to indicate which map attributes are critical and which are not. As an example, the algorithm can be configured to determine that an identification, or identifier (ID) for a map attribute, such as a road, and corresponding location data, such as coordinates (e.g., lat/long) for the map feature, are in a highest criticality group, because the nav unit must at a minimum know where such features are.

As another example of a pre-programmed high-critical attribute, a traffic-control attribute, such as a stop sign, stop light, or one-way-street sign or indicator, are in some embodiments pre-programmed into the algorithm as highly critical.

In some embodiments, the criticality level that a map attribute is assigned can depend on context. For instance, the assignment can depend on whether the nav unit is part of a vehicle that is being driven autonomously. Provision of an indicator of a stop sign is much more important to an autonomously driven vehicle and a user-driven vehicle. While an autonomous vehicle may be configured (by camera, radar, etc.) to determine when the vehicle is approaching a stop sign, it could be determined very important to also have the sign indicated in the map as a primary or secondary indication of the stop sign considering the ultra-high importance and safety value of the vehicle recognizing the sign.

Example low criticality attributes include restaurants, public parks, other geographic indications that do not affect driving, stores, other establishments.

The criticality can be adaptive, or dynamic, as referenced, such as based on application need. As mentioned above in this way, attributes can also be divided into application categories, which can be assigned criticality numbers, or be defined as required based on application need. For example, if the navigation system is active and a real-time traffic layer is requested, the required map elements would include those related to the navigation and traffic data that has been requested by the application. Alternatively, if only the real-time traffic information is needed, other types of navigation data would not need to be requested.

In various embodiments, attributes such as speed limit, elevation, and attribute name (e.g., street name) are assigned as a medium or low criticality group.

In various embodiments, a road-grade, or slope, attribute is assigned to the medium or low criticality group. Again, criticality or criticality levels or groups can be determined adaptively, or dynamically, such as based on transmission mode. If the mode is "eco," could be marked as high priority, for instance. These factors can be important, for instance, to vehicle power management in an electric and/or autonomous driving vehicle, but not likely to be viewed as highly critical.

At block 506, the processor generates a map data set—for instance, modifies an existing map data set, or pulls select elements from the existing set—based on the prior analysis, to include the critical features. Map databases are configured in a readable manner that can be encoded or altered. They allow use of readily available tools for adjusting qualities of map data, such as by being configured according to a structure-query-language (SQL) format having extensible markup language (XML) properties, being readily and easily searchable. The map data can be searched easily to indicate one or more attributes of a certain type (e.g., restaurant), or of a certain type in a certain area (e.g., restaurants that are not within two miles of a nav unit location), and a new map data set, or sub-set, can be formed by removing such non-critical attributes.

The operation 506 can be performed by an attribute-based-encoding module 406 (FIG. 4), or just an encoding module, comprising computer code configured to cause the processor 306 to perform the functions of this operation 506. The encoding module 406, like all features described herein, can be referenced by other terms, such as editing module, the like, or other.

At block 508, the processor 306 schedules, transmits, or initiates transmission of periodic downloads, or pre-loads, to the navigation unit of critical attributes identified at operation 504, and separated out at operation 506. The periodic downloads can be performed weekly, monthly, or quarterly, for instance.

In various embodiments, the operation 508 includes arranging attributes of the first group, or of the first and second group, referenced above, for download to the nav unit.

In some embodiments, the operation 508 includes arranging non-critical data for being available for provision to the nav unit on-demand non-critical data can include, for instance, the third criticality group, or the third and second criticality groups, referenced above.

From another perspective, critical data is pushed to the nav unit, while non-critical data is made available for pull—i.e., being pulled by the nav unit.

The operation 508 can be performed by a map-data-delivery module 408 (FIG. 4) comprising computer code configured to cause the processor 306 to perform the functions of this operation 508. Other terms for the module 408 include data-availability module, pre-load/on-demand module, the like, or other.

The process 500 can end 509 or any one or more operations of the process 500 can be performed again.

While corresponding operations of the nav unit—e.g., the hardware-based controller 100—are not shown expressly in the figures, the operations and associated computing structure are described directly or indirectly herein. The nav unit receives the critical data transmitted or made available according to step 508, above, for instance. The nav unit receives the critical data pushed, and demands the less-critical, or non-critical, map data. In various embodiments, the nav unit provides a request or parameter to the remote processor 306, affecting determinations at the processor, such as by affecting determination of attributes considered as critical, or non-critical, such as by increasing a priority of an attribute—for instance, by raising the importance in a user account for local business locations, or locations of businesses of a certain type, which may be very important for a salesman, for instance.

As other example nav unit operations, performed by the unit being, or being associated with (e.g., connected to, part of) the controller 100 of FIG. 1, the nav unit can:

(I) Periodically (e.g., monthly) obtain (e.g., fetch or receive) the mentioned map-data pre-load, or download, having the critical or high-importance which can be referred to as a baseline map;

(II) determine dynamically whether the baseline map is sufficient—for instance, whether a cache storing map data, including the baseline map, comprises enough map data for present and/or expected navigation unit functions;

(III) In response to an affirmative result from step (II), then proceed using the baseline map in nav unit operations, and in parallel or intermittently re-perform the decision of step (II), and continue to perform step (I), periodically;

(IV) In response to a negative result from step (II), then predict movement-related factors for use in determining what data should be requested, or demanded, of the remote server or system 117—e.g., factors being current position, speed and heading—and proceed to step (IV);

(V) Obtain—e.g., fetch—needed data, such as high-definition map data (likely not previously pre-loaded) corresponding to a more-pertinent region, such as regarding a two-mile radius, or forward-facing purview (e.g., cone with apex at the nay-unit location), or two-miles of current road plus portions of connecting roads of certain road class;

(VI) In various embodiments, obtain additional data, such as low-definition map data (also likely not previously pre-loaded) corresponding to a more-pertinent region, such as regarding a region between the two mile and a five-mile radius, or corresponding forward-facing purview; and (VII) Return to (I), (II), or (IV).

V.B. Second Progressive-Encoding Algorithm—FIG. 6

The second example progressive-encoding algorithm, illustrated as a process or flow 600, determines what map data to send or make available to a navigation unit, and when, based on a determined level of granularity or detail required by, or preferred to be provided to or received by, the navigation unit under the circumstances.

The basis is a second example basis, or tuning parameter, affecting tunable map parameters, such as the content, timing, manner, and channel in providing map data.

The process 600 begins 601 and in various embodiments, the algorithm 600 includes an operation, indicated by diamond 602, whereat a processor, such as the hardware-based processing unit 306 determines whether a resource-scarce scenario exists. The decision 602 can be performed by the resource-availability module 402 (FIG. 4) comprising computer code configured to cause the processor to perform the functions of this operation 602.

The determination 602 can be like the analogous operation 502 of FIG. 5, and so is not described in further detail here.

In embodiments comprising the decision 602, if the resource-scarce condition is not found present, flow returns to subsequently perform the decision 602. In this case, mapping operations could proceed in a last-established, normal mode, or default mode, for the time being.

If the resource-scarce condition is found present at diamond 602, flow proceeds to operation 604, whereat the processor determines a required or preferred level of map granularity or detail to provide to the navigation unit.

The operation 604 can be performed by a granularity-determination module 410 (FIG. 4).

The granularity-determination module 410, the second of the example tuning-parameter modules, includes computer code configured to cause the processor 306 to perform the functions of this operation 604.

The determined granularity controls, for instance, an area or length of relevant road segment(s) provided to the navigation unit. The determined granularity could control, for example, the size of a geographic area for which map data, generally, or particular map data, such as regarding a road or roads, would be provided to the navigation unit. Examples of granularity characteristics include, for various embodiments, providing road centerline geometry vs, lane geometry, different levels of grade or super-elevation data (e.g., 1%, 5%, or x % increments), accuracy (e.g., 95% or y % of provided data has maximum deviation <2 meters, or <z meters)

Factors in the determination in various embodiments include; (i) a pre-established granularity setting, (ii) cost of data transmission at the time, (iii) allotted amount of data transfer for a present period of time (e.g., data-transfer allowance, such as allotted by a wireless service provider for an OEM or customer-service center (e.g., OnStar®), (iv) available bandwidth for data transmission, (v) any applicable limits on data transmission, (vi) available data storage at the navigation unit or associated computer (e.g., in-vehicle; OBC), (vii) speed by which the navigation unit is moving, (viii) data traffic, or data-throttling, considerations, such as with consideration given to other vehicle software communication needs, (ix) any applicable service provider limits related to system access (API invocations, etc.), (x) location of the navigation unit, and (xi) available levels of accuracy or detail in source map data.

Regarding the latter factor (xi), for instance, if map data is only available corresponding to a road segment at an accuracy, or resolution, of only 50 meters and 200 meters, and accuracy of 100 meters is preferred or required, the processor may elect to provide associated data at 50-meter accuracy, though it is more than is needed. Or, the algorithm could be configured to, if the level sought is only a preference, consider other factors, such as the cost of obtaining the 50-meter data versus the benefit of having more accurate data and/or versus the detriment of having less-accurate data for the subject segment, and elect the 200-meter accuracy data.

Granularity setting could be based on application requirements (e.g., manual driving vs. automated driving, or eco driving as described above), cost of data transmission is based on time of day or plan details, allotted data would also be part of plan, available bandwidth could be estimated based on current performance or historical results, storage could be built-in to the nav unit or extended via SD, USB, etc., vehicle speed may affect the update requirements, potentially longer range detail would need to be provided, e.g., increase electronic horizon from 200 meters to 300 meters, location of the nav unit may impact the fetching part, e.g., if the vehicle goes into a known area with no cellular coverage, it might pre-fetch additional data.

In various embodiments, available, optional levels of granularity already exist in a relevant map-data source—e.g., a relevant map database or stored map structure. The map-data source can be, for instance, an open-source street map data source or a proprietary map data source, as examples.

At block 606, the processor generates a map data set—for instance, modifies an existing map data set, or pulls select elements from the existing set—based on the applicable granularity determined at the prior operation 604.

As mentioned, map databases, being configured in a readable manner that can be encoded or altered, allow use of readily available tools for adjusting qualities of map data, such as by being configured according to a structure-query-language (SQL) format having extensible markup language (XML) properties, being readily searchable.

The operation 606 can be performed by a granularity-based-encoding module 412 (FIG. 4), or just an encoding module, comprising computer code configured to cause the processor 306 to perform the functions of this operation 606. The granularity-based-encoding module 412, like all features described herein, can be referenced by other terms, such as editing module, the like, or other.

At block 607, the processor 306 schedules, transmits, or initiates transmission of the map data configured for purpose of nav-unit refresh, update, or pre-load. Pre-loads can be performed periodically, such as weekly, monthly, or quarterly, or via application request, for instance.

The operation 607 can be performed by a map-data-delivery module, like the module 408 referenced above in connection with operation 508 of FIG. 5. As mentioned, other terms for the module 408 include data-availability module, pre-load/on-demand module, the like, or other.

The process 600 can end 609 or any one or more operations of the process 600 can be performed again.

While corresponding features of the nav unit—e.g., the hardware-based controller 100—are not shown expressly in the figures, operations of the nav unit, or associated computing structure, are provided. The nav unit, for instance, receives the map data pushed, comprising the determined level of granularity appropriate for the present context. In various embodiments, the nav unit provides a request or parameter to the remote processor 306, affecting determinations at the processor, such as by affecting the determination of the applicable level(s) of granularity appropriate for one or more attributes (operation 604) or determining when and how (e.g., push versus pull, or on-demand) to deliver, or make available, the corresponding data to the nav unit (operation 607).

Other nav unit operation can include the seven (VII) operations mentioned above in connection with FIG. 5.

V.C. Third Progressive-Encoding Algorithm—FIGS. 7, 9-12

The third example progressive-encoding algorithm, illustrated as a process or flow 700, determines what map data to send or make available to the navigation unit, and when, based on navigation-unit movement. For embodiments in which the navigation-unit movement is associated with user movement, such as when the user rides in or drives a vehicle that the nav unit is a part of, the basis can be referred to as user behavior, or driver behavior.

The basis is a third example basis, or tuning parameter, affecting tunable map parameters, such as the content, timing, manner, and channel in providing map data.

Nav-unit movement can also be referred to as user, or driver, behavior in embodiments in which the unit is in a vehicle driven by the user. The technology can also be implemented in connection with semi-autonomous and autonomous vehicles.

The process 700 begins 701 and in various embodiments, the algorithm 600 includes an operation, indicated by diamond 702, whereat a processor, such as the hardware-based processing unit 306 determines whether a resource-scarce scenario exists. The decision 702 can be performed by the resource-availability module 402 (FIG. 4) comprising computer code configured to cause the processor to perform the functions of this operation 702.

The determination 702 can be like the analogous operation 502 of FIG. 5, and so is not described in further detail here.

In embodiments comprising the decision 702, if the resource-scarce condition is not found present, flow returns to subsequently perform the decision 702. In this case, mapping operations could proceed in a last-established, normal mode, or default, mode for the time being.

If the resource-scarce condition is found present at diamond 702, flow proceeds to operation 704, whereat the processor analyzes nav-unit movement. Movement considered can include historic, or historic and present movement.

The operation 704 can be performed by a movement-analysis module 414 (FIG. 4). The movement-analysis module 414, the third of the example tuning-parameter modules, includes computer code configured to cause the processor 306 to perform the functions of this operation 704.

Nav-unit movement, corresponding to user behavior or movement with the unit in most cases, can be represented in any of a variety of ways. FIG. 9 shows an example chart 900 of nav-unit movement 901. The chart includes x and y axes representing longitude and latitude coordinates.

The processor determines at least one objective value representing a manner by which the nav unit has visited various areas or routes. The processor in various embodiments, determines, for instance, any of (a) an amount of time that the nav unit spends in subject areas or particular routes, (b) a number of separate visits that the nav unit makes to areas or routes, (c) a frequency with which the nav unit visits the areas or routes.

Based on the objective value(s) considered, the movement 901 is divided into a plurality of categories. In the example of FIG. 9, the movement 901 is parsed into a low-travel portion(s) 902, medium-travel portion(s) 904, and high-travel portion(s) 906.

FIG. 10 shows a graph 1000 showing the movement objectively. Particularly the graph 1000 charts a line 1001 between a y axis representing a variable of movement—number of visits to the area or route—by way of example—and an x axis representing an index. The field is divided into three travel groups 1002, 1004, 1006, corresponding to the three levels of movement 902, 904, 906 described. The line 1001 is divided into three parts 1012, 1014, 1016 accordingly.

Flow proceeds to operation 706, whereat the processor determines, based on results of the movement analysis 704, what map attributes to provide to the unit by download and/or which attributes to remove and make available to the navigation unit on-demand later upon nav-unit request. The operation 706 can be performed by an attribute-determination module 416 (FIG. 4) comprising computer code configured to cause the processor 306 to perform the functions of this operation 706.

The operation 706 in various embodiments includes determining available map attributes to be categorized as critical or more-important and those to be categorized as less important. Levels of criticality can be classified as desired, such as into two, three, four, or more groups, as mentioned.

Figure 12:
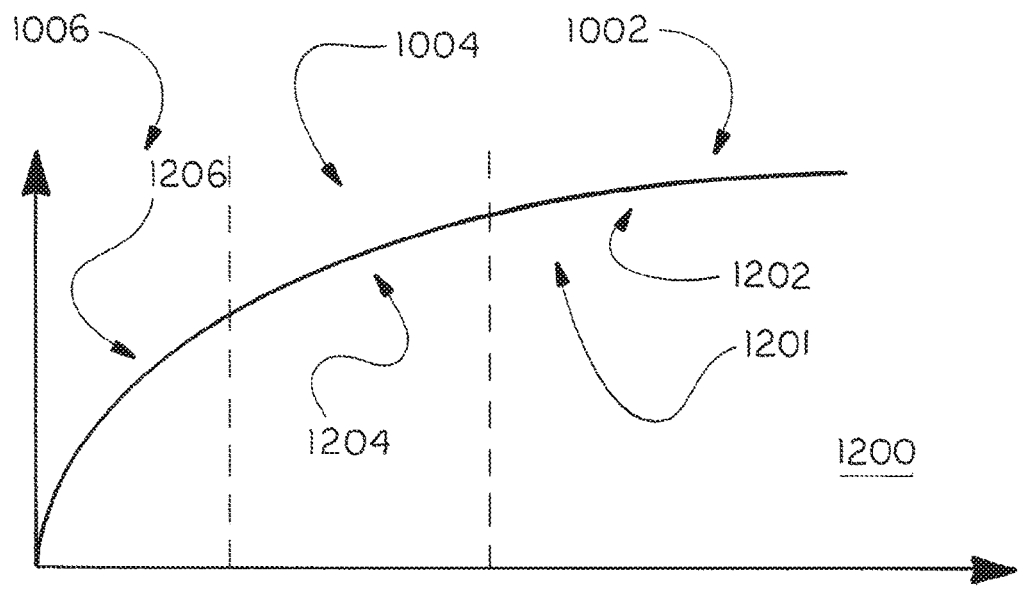
FIG. 12 illustrates a chart, consistent with the data of FIGS. 9-11, including an amount of on-demand map-data download needed (y axis) as a function of the road-segment index (x axis), also relevant to the second progressive encoding process of FIG. 6.

In one set of embodiments, more critical data is provided by pre-load to the nav unit in connection with areas or routes (e.g., areas or routes 902 associated with the travel group 1002) in which the navigation unit has traveled more. The technique saves data-related costs, including transmission-related cost, storage cost, for example, by not sending for pre-load to the navigation unit high-density information that will likely not be needed by the user or vehicle based on the past movement. Less critical or important data, linked to the less-traveled areas or routes, is stored or otherwise left to be provided to the nav unit on demand, upon nay-unit request. The algorithm can be configured so that there are only two groups 1002, 1006, or so that some or all of the middle group 1004 is treated as if critical, with group 1006, or non-critical, with group 1002. For this set of embodiments, FIG. 11 is provided, showing a graph 1100 showing a line 1101 indicating an apparent or determined value (y axis) for providing dense or critical information to the nav unit in connection with the various groups 1002, 1004, 1006, wherein the x axis is the aforementioned index. The field is divided into the three travel groups 1002, 1004, 1006, corresponding to the three levels of movement 902, 904, 906 described. The line 1001 is divided into three parts 1102, 1104, 1106, accordingly. Further for this set of embodiments, FIG. 12 is provided, showing a graph 1100 showing a line 1101 indicating an expected number of on-demand map-data requests (y axis) from the nav unit in connection with travel on routes associated with the various groups 1002, 1004, 1006, wherein the x axis is again the aforementioned index. The line 1201 is divided into three parts 1202, 1204, 1206 accordingly. More requests are expected in connection with travel to areas in which the user with the nav unit travels less-frequently, corresponding to the first group 1002, because more data was pre-loaded to the nav unit in connection with the areas traveled more frequently, corresponding to the third group 1006.

In an alternative, contemplated, set of embodiments, more critical data is provided by pre-load to the nav unit in connection with areas or routes (e.g., areas or routes 906 associated with the travel group 1006) in which the navigation unit has traveled less. The technique considers that the user or vehicle needs less information about areas or routes with which they are very familiar, such as route between home and the grocery store or work. The higher level of information would thus better inform the user or vehicle when travelling in areas or on routes for which they are less familiar. Less critical or important data, linked to the more-traveled areas or routes, is stored or otherwise left to be provided to the nav unit on demand, upon nay-unit request. The algorithm can be configured so that there are only two groups 1002, 1006, or so that some or all of the middle group 1004 is treated as if critical, with group 1002, or non-critical, with group 1006. Though a value chart like the chart 1100 of FIG. 11 is not shown in connection with this second set of embodiments, one can be provided for this set of embodiments. In it, the data line would be flipped horizontally from the line 1101 in FIG. 11—i.e., the line would increase exponentially from left to right in the view, with the index values and groups 1002, 1004, 1006 kept the same as in FIG. 10. Similarly, though a data-demand chart like the chart 1200 of FIG. 12 is not shown in connection with this set of embodiments, one can be provided for this set of embodiments. In it, the data line would be flipped horizontally from the line 1201 in FIG. 12—i.e., the line would decrease exponentially from left to right in the view, with the index values and groups 1002, 1004, 1006 kept the same as in FIGS. 10 and 11.

While charts like the charts 1000, 1100 of FIGS. 10 and 11 are not referenced in connection with the first two algorithms 500, 600, the same concepts apply, and the same or similar charts can be provided. For instance, a value chart like the chart 1000 of FIG. 10 can be provided for each algorithm 500, 600 representing a perceived or determined value of providing critical data in connection with the respective conditions—e.g., certain map attribute/s, regarding the first algorithm 500, and certain granularity/ies regarding the second algorithm 600. Similar extension t regarding the chart 1100 of FIG. 11 is likewise contemplated.

At block 708, based on the results of the prior operations, the processor generates a map data set. The operation can include, for instance modifying an existing map data set, or obtaining select elements from the existing set.

As mentioned, map databases, being configured in a readable manner that can be encoded or altered, allow use of readily available tools for adjusting qualities of map data, such as by being configured according to a structure-query-language (SQL) format having extensible markup language (XML) properties, being readily searchable.

The operation 708 can be performed by a movement-based-encoding module 418 (FIG. 4), or just an encoding module, comprising computer code configured to cause the processor 306 to perform the functions of this operation 708.

At block 710, the processor 306 schedules, transmits, or initiates transmission of the map data configured for purpose of nay-unit refresh, update, or pre-load. Pre-loads can be performed periodically, such as weekly, monthly, or quarterly, for instance.

The operation 710 can be performed by a map-data-delivery module, like the module 408 referenced above in connection with operation 508 of FIG. 5. As mentioned, other terms for the module 408 include data-availability module, pre-load/on-demand module, the like, or other.

The process 700 can end 711 or any one or more operations of the process 600 can be performed again.

While corresponding features of the nav unit—e.g., the hardware-based controller 100—are not shown expressly in the figures, operations of the nav unit, or associated computing structure, are provided. The nav unit, for instance, receives the map data pushed, comprising the critical map data in association with linked movement areas or routes. In various embodiments, the nav unit provides a request or parameter to the remote processor 306, affecting determinations at the processor, such as by affecting determination of the area or routes for which critical or particular information, affecting what map attributes are considered critical or non-critical (or an intermediate level), such as by raising the importance in a user account for local business locations for a salesman, or determining when and how (e.g., push versus pull, or on-demand) to deliver, or make available, the corresponding data to the nav unit the corresponding data to the nav unit (operation 607).

The process 700 can end 711 or any one or more operations of the process 700 can be performed again.

Other nav unit operation can include the seven (VII) operations mentioned above in connection with FIG. 5.

V.C. Hybrid Connectivity Platform—FIGS. 8 and 12

FIG. 8 shows an example hybrid, multi-path, algorithm, represented by a flow-based process 800, for determining which of multiple available channels by which to transfer data to the navigation unit.

As mentioned, the technology in various embodiments includes a hybrid connectivity platform configured to schedule transmission of prioritized map contents over a first communication channel, such as via one particular wireless path, while non-priority, or less-priority, data is transferred over a second communication channel, such as another wireless path, wherein the channels are associated with different use costs.

The process 800 begins 801 and in various embodiments, the algorithm 800 includes an operation, indicated by diamond 802, whereat a processor, such as the hardware-based processing unit 306 determines whether a resource-scarce scenario exists. The decision 802 can be performed by the resource-availability module 402 (FIG. 4) comprising computer code configured to cause the processor to perform the functions of this operation 802. The determination 802 can be like the analogous operation 502 of FIG. 5, and so is not described in further detail here.

In embodiments comprising the decision 802, if the resource-scarce condition is not found present, flow returns to subsequently perform the decision 802. In this case, mapping operations could proceed in a last-established, normal mode, or default, mode for the time being.

If the resource-scarce condition is found present at diamond 802, flow proceeds to operation 804, whereat the processor determines which communication channel(s) to use to deliver map data to the nav unit, and in some cases also when. The operation can be performed by a hybrid-communication-channel module 420. The data is delivered at operation 806 accordingly. The process 800 can end 807 or be repeated.

FIG. 13 illustrates schematically an environment 1300 showing aspects of a hybrid, multi-path, connectivity platform, according to an embodiment of the present technology. The figures shows an example data set 1302 for a map attribute, such as a road segment. The set 1302 includes data components 1304, such as a first data component $1304^1$ representing an identifier or identifying indicator (e.g., alphanumeric code) for the map attribute, a second data component $1304^2$ representing a longitude of a start of the map attribute such as a longitude of a starting point of the road segment, a third data component $1304^3$ representing a latitude of a starting point of the map attribute, a fourth data component $1304^4$ representing an ending longitude of the map attribute, and a fifth component $1304^5$ representing an ending latitude of the map attribute. These elements are generally considered critical. Related attributes, such as curve profile data, elevation profile data for the attribute (e.g., road) can be categorized as critical or other levels of criticality, such as non-critical or medium criticality, depending on the embodiment and designer or user preferences.

Optional communication channels can be grouped, such as into the three groups or communication bands 1310, 1320, 1330 shown. The first group 1310 includes cellular and/or satellite communications 1312, for instance. The second group 1320 include external Wi-Fi 1322, such as local infrastructure, hotspots, or beacons, and/or an in-system wireless network 1324, such as in-vehicle Wi-Fi. The third group 1330 includes a peer-to-peer wireless channel 1332, such as Dedicated Short-Range Communications (DSRC).

Characteristics of the channels are considered in making any such groupings, and group characteristics are processed in determining what data to send by the various channels. Each generally is associated with positive and negative characteristics. While the first group 1310, for instance, is generally the most reliable, being available almost all of the time, with reliable signal-strength levels, for instance, the first group 1310 is generally more expensive, though. While the third group 130 is less reliable, being more opportunistic, depending on whether any peer systems, such as other participating vehicles, are nearby, the cost is generally notably lower than that for using a channel 1312 of the first group 1310. The second group 120 has intermediate pros and cons.

In various basic embodiments, the process determined at operation 804 to send critical data by way of a channel of the first group 1310 and less critical data by way of a channel of the second or third group 1330. In some instances, the third group is not used, being determined too unreliable, and so non-critical data would be send by the second group, as shown in FIG. 13, regarding the last attribute $1304n$. For embodiments in which map data is classified between critical and non-critical, the data can be assigned for transmission by the second or third group, depending on how the system is configured.

In various embodiments, one or more functions are used to determine which map attributes to send via which communication channels.

As an example, an overall utility function is provided, considering price presented, latency, and energy factors. The factors considered can include any one or two of these, instead, other factors, or more factors, all in any combination, without departing from the scope of the present invention.

Weighting factors in various embodiments include learned behaviors or learned preferences of the user, such as most frequently used features, and any applicable safety rating(s) of the relevant data.

Other example factors could include effective bandwidth of a relevant data-communication channel or pipe, reliability of the channel, quality of transmissions by the channel, jitter (e.g., a 2nd-order function of delay) associated with the channel, and any other Quality-of-Service (QoS) parameters.

In the primary example, the overall utility function can be provided as follows:

$$u_{c_i} = a_1 \frac{P_{min} - p_i}{p_i} + a_2 \frac{L_{min} - l_i}{l_i} + a_3 \frac{C_{min} - c_i}{c_i} \qquad [\text{Eq. 1}]$$

wherein:

$u_{ci}$ is a result of the utility function;

$a_1$ is a first, price, multiplier, or weighting factor, set depending on an amount of weight determined to be assigned, by a designer of the system to the factor (a price factor) adjacent the multiplier $a_1$;

$P_{min}$ is a global minimum price available under all circumstances, or for all configurations i . . . m for transferring data; considering every combination of channel usage for the subject map attribute components 1304, m being a final configuration;

$p_i$ is a price applicable for a presently considered configuration i, of all of those available;

$a_2$ is a second, latency, multiplier; or weighting factor, set depending on an amount of weight determined to be assigned, by a designer of the system to the factor (regarding latency, or speed or delay of transferring data) adjacent the multiplier $a_2$;

$L_{min}$ is a global best latency available under all circumstances, or for all configurations i . . . m for transferring data;

$l_i$ is a latency applicable for the presently considered configuration i;

$a_3$ is a third, energy, multiplier, or weighting factor, set depending on an amount of weight determined to be assigned, by a designer of the system to the factor (regarding energy that would be required by the nav unit and/or associated local systems) adjacent the multiplier $a_3$;

$E_{min}$ is a global minimum energy requirement (e.g., vehicle energy requirement) available under all circumstances, or for all configurations i . . . m for transferring data; and $e_i$ is a local energy requirement (e.g., vehicle energy requirement) applicable for the presently considered configuration i.

Weighting multipliers can be set in any of a wide variety of ways, such as depending on operator preference (e.g., OEM, customer-service center), user preference, regulations, local (e.g., vehicle) energy requirements or goals.

Related to user preference, weighting is in various embodiments dynamically adjusted based on context. Example results include downloading additional map attributes during adverse weather conditions, or increased traffic conditions.

As another example context, weighting could be affected based on a type or grouping of the user, such as whether they are an individual customer or a fleet vehicle.

Regarding energy requirements or goals, for instance, a designer can consider, or design the system(s) 100, 300 to consider that the third multiplier $a_3$ should be larger if the vehicle is an electric or hybrid vehicle, or if the vehicle is electric or hybrid and low on power at the time, or relatively low in comparison with a determined trip—e.g., on the highway with a far-off destination.

The overall utility function thus includes three sub utility factors or functions:

A first, price, utility function $f(p_i)$, corresponding to the factor shown directly adjacent the first multiplier $a_1$, which can be referred to as by reference $u_{pi}$;

A second, latency utility function $f(l_i)$, corresponding to the factor shown directly adjacent the second multiplier $a_2$, which can be referred to as by reference $u_{li}$; and A third, energy utility function $f(e_i)$, corresponding to the factor shown directly adjacent the third multiplier $a_3$, which can be referred to as by reference $u_{ei}$.

Once every configuration i has been processed through iterations of the overall utility function $u_{ci}$, a configuration-selection function can be applied to identify the best configuration, amongst the many options, under all of the circumstances. The configuration-selection function can be presented as follows:

$$C_i = \max_i (u_{c_i}), \; C_i \in [1, 2, 3, \ldots, 3^m] \qquad [\text{Eq. 2}]$$

wherein $C_i$ represents the preferred configuration, selected from amongst the optional configurations m.

Generally, the configuration providing the highest balance benefit is preferred and selected, the balance being controlled largely by the selected values of the weighting factors $a_1$, $a_2$, $a_3$.

In various embodiments, a preferred, selected, or best configuration is chosen based on a search—e.g., a through, exhaustive or semi-exhaustive search—in a design space, such as in an entire design space, among some or all the possible configurations being evaluated. Other optimization approaches are contemplated and possible, such as, and not limited to, brunching and bounding, to improve speed or other performance metric for the process.

The resulting configuration can determine, for instance, that the first give map attributes $1304^{1-5}$ are best provided via a first group 1310 channel, and the balance of attributes $1304^{1-n}$ are best provided via a second group 1320 channel. This result is the one shown in FIG. 13.

The algorithm is further configured in various embodiments to initiate transmitting map data, generated according to any or a combination of the afore-mentioned algorithms 500, 600, 700. The functions can be performed by modules equivalent or similar to the map-data-delivery module 408 described above in connection with the other algorithms 500, 600, 700. Map attribute data can be delivered as such as the manner shown schematically in FIG. 13, by way of example.

VI. Select Advantages

Many of the benefits and advantages of the present technology are described above. The present section restates some of those and references some others. The benefits described are not exhaustive of the benefits of the present technology.

Aspects of the present technology can be used to rendering maps comparable to that provided by modern mapping systems, but with less or smarter data usage. The process can render comparable mapping using less data and/or less expensive data—e.g., less data-storage cost, transmission or bandwidth cost, and/or less expensive processing resources.

Similarly, the technology can be used to deliver enhanced mapping services for generally the same cost as that required for operating other modern mapping systems. The enhanced services can include provision of additional mapping features, such as additional map attributes, definition, clarity, or functions for user interaction.

The approaches of the present technology are compatible with commercial and open source map formats. The technology can thus be implemented with relative ease and is scalable across existing platforms.

In embodiments implemented partially, if not primarily, at system or server remote to the vehicle (e.g., in the cloud), deployment is also facilitated because downloads are performed remote to the many local navigation units in which maps—e.g., customized maps—will be rendered. If all functional improvement provided herein were performed locally, at the navigation unit, it would be more challenging to update software and/or hardware as needed at each navigation unit.

For embodiments controlling map-related functions based on navigation-unit movement, the present technology leverages existing or readily obtainable data regarding navigation-unit movement. The data is, in various implementations considered, readily available or obtainable. The data may be available because the movement is already being tracked with customer pre-approval by an entity, such as by an OEM, customer-service center (e.g., Onstar®), or wireless communications service provider the drive behavior. Or the data can be easily determined based on available data or an existing manner for obtaining the data.

For embodiments controlling map-related functions based on map features, the present technology leverages existing or readily obtainable data regarding the attributes.

For various embodiments, the present technology leverages readily available tools for adjusting qualities of map data being rendered. As just an example, the data can be identified in a structure-query-language (SQL) format, such as by a SQL database or dataset, and searched based on extensible markup language (XML) properties to be adjusted according to the principles outlined herein.

VII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed:

1. A system comprising:
   a hardware-based processing unit; and
   a non-transitory computer-readable storage device comprising:
      a resource-availability module configured to cause the processing unit to determine whether a resource scarcity condition exists in connection with providing map data to a mobile navigation unit;
      a tuning-parameter module having map attribute criticality, the tuning-parameter module comprising a priority-setting module configured to cause the processing unit to, in response to determining that the resource scarcity condition exists, classify traffic-control attributes as more-critical and non-traffic-control attributes as less-critical to provide to the mobile navigation unit;
      an encoding module configured to cause the processing unit to encode map data based on the tuning parameter; and
      a map-data-delivery module configured to cause the processing unit to provide or make available the encoded map data to the mobile navigation unit.

2. The system of claim 1 wherein the priority-setting module is configured to cause the processing unit to classify traffic-control attributes as more-critical and non-traffic-control attributes as less-critical based at least in part on a parameter received from the mobile navigation unit.

3. The system of claim 1 wherein the encoding module comprises an attribute-based encoding module that, in being configured to cause the processing unit to encode map data, is configured to generate a critical map-data set comprising the more-critical attributes and a non-critical map-data set comprising the less-critical attributes.

4. The system of claim 3 wherein the map-data-delivery module is configured to initiate transmitting the critical map-data set to pre-load the navigation unit, and to make the non-critical map-data set available for on-demand provision to the navigation unit.

5. The system of claim 1 wherein:
   the tuning parameter includes map granularity; and
   the tuning-parameter module comprises a granularity-determination module configured to cause the processing unit to determine a required or preferred level of map granularity at which to provide map data to the navigation unit based on requirements of an application consuming the map data.

6. The system of claim 5 wherein the encoding module comprises a granularity-based-encoding module and, in being configured to cause the processing unit to encode map data, is configured to cause the processing unit to adaptively, based on the level of map granularity determined, generate a lower granularity-level map data, to consume less bandwidth, and a higher granularity-level data set, consuming more.

7. The system of claim 6 wherein the map-data-delivery module is configured to initiate transmitting the low-granularity-level map data-set to pre-load the navigation unit, and to make the higher-granularity-level map-data set available for on-demand provision to the navigation unit.

8. The system of claim 1 wherein the non-transitory computer-readable storage device further comprises a movement-analysis module configured to cause the processing unit to analyze navigation-unit movement data indicating current and/or historic movement of the navigation unit.

9. The system of claim 8 wherein:
   the tuning parameter includes navigation unit movement; and
   the tuning-parameter module comprises an attribute-determination module configured to cause the processing unit to, based on results of the movement analysis, select more-critical and less-critical map attributes, yielding an attribute-determination result.

10. The system of claim 9 wherein the encoding module comprises a movement-based-encoding module configured to cause the processing unit to, using the attribute-determination result, generate a critical map-data set comprising the more-critical attributes and a non-critical map-data set.

11. The system of claim 10 wherein the map-data-delivery module is configured to cause the processing unit to initiate transmitting the critical map data-set to pre-load the navigation unit, and to make the non-critical map-data set available for on-demand provision to the navigation unit.

12. A system comprising:
   a hardware-based processing unit; and
   a non-transitory computer-readable storage device comprising:
      a resource-availability module configured to cause the processing unit to determine whether a resource scarcity condition exists in connection with providing map data to a mobile navigation unit;
      a tuning-parameter module having map attribute criticality, the tuning-parameter module comprising a priority-setting module configured to cause the processing unit to, in response to determining that the resource scarcity condition exists, classify traffic-control attributes as more-critical and non-traffic-control attributes as less-critical to provide to the mobile navigation unit;
a hybrid-communication-channel module configured to cause the processing unit to, in response to determining that the resource scarcity condition exists, determine a map-data-delivery arrangement indicating one or more of multiple optional communication channels or channel bands by which to transmit components of the map data; and
a map-data-delivery module configured to cause the processing unit to provide or make available the encoded map data to the mobile navigation unit by way of the communication channel or band determined.

13. The system of claim 12 wherein the optional channels or bands include one or more of a cellular communication channel, a satellite communication channel, another long-range communication channel, a short-range communication channel, and a medium range communication channel.

14. The system of claim 12, wherein:
the non-transitory computer-readable storage device further comprises
an encoding module configured to cause the processing unit to encode map data based on the tuning parameter; and
the map data encoded is provided to or made available to the mobile navigation unit in operation of the system.

15. The system of claim 12 wherein:
the tuning parameter includes map granularity; and
the tuning-parameter module comprises a granularity-determination module configured to cause the processing unit to determine a required or preferred level of map granularity at which to provide map data to the navigation unit based on requirements of an application consuming the map data.

16. The system of claim 12 wherein:
the non-transitory computer-readable storage device comprises a movement-analysis module configured to cause the processing unit to analyze navigation-unit movement data indicating current and/or historic movement of the navigation unit;
the tuning parameter includes navigation unit movement; and
the tuning-parameter module comprises an attribute-determination module configured to cause the processing unit to, based on results of the movement analysis, select more-critical map attributes and less-critical map attributes, yielding an attribute-determination result.

17. A system, comprising:
a hardware-based processing unit; and
non-transitory computer-readable storage device comprising:
a resource-availability module configured to cause the processing unit to determine whether a resource scarcity condition exists in connection with providing map data to a mobile navigation unit;
a tuning-parameter module having map attribute criticality, the tuning-parameter module comprising a priority-setting module configured to cause the processing unit to, in response to determining that the resource scarcity condition exists, classify traffic-control attributes as more-critical and non-traffic-control attributes as less-critical to provide to the mobile navigation unit; and
a hybrid-communication-channel module configured to cause the processing unit to, in response to determining that the resource scarcity condition exists, determine a map-data-delivery arrangement indicating one or more of multiple optional communication channels or channel bands by which to transmit components of the map data.

18. The system of claim 17 wherein the optional channels or bands include one or more of a cellular communication channel, a satellite communication channel, another long-range communication channel, a short-range communication channel, and a medium range communication channel.

* * * * *